United States Patent [19]

Ward

[11] Patent Number: 4,563,585

[45] Date of Patent: Jan. 7, 1986

[54] MONITORING GAS AND VAPOR CONCENTRATIONS

[75] Inventor: T. Victor Ward, Thornhill, Canada

[73] Assignee: Moniteg Ltd., Concord, Canada

[21] Appl. No.: 422,478

[22] Filed: Sep. 23, 1982

[51] Int. Cl.[4] .......... G01J 1/42

[52] U.S. Cl. .......... 250/373; 356/51; 356/320

[58] Field of Search .......... 356/320, 331, 334, 51, 356/310, 325; 250/343, 373

[56] References Cited

U.S. PATENT DOCUMENTS

| | | | |
|---|---|---|---|
| 3,279,308 | 10/1966 | Bartz et al. | 356/51 |
| 3,518,002 | 6/1970 | Barringer et al. | 356/310 |
| 3,522,739 | 8/1970 | Coor et al. | 356/325 X |
| 3,554,649 | 1/1971 | Ridgway | 356/334 |
| 3,837,744 | 9/1974 | Egan et al. | 356/310 |
| 4,057,734 | 11/1977 | Barringer | 250/575 |

*Primary Examiner*—F. L. Evans
*Attorney, Agent, or Firm*—Ridout & Maybee

[57] ABSTRACT

In the monitoring of gas or vapor concentrations in a gas sample by comparing the transmission of light through the sample at different wavelengths corresponding to behaviorial maxima and minima of the gas, the different wavelengths are selected by permitting light to fall alternately on different sets of slits in an entrance mask of a spectroscope so that light diffracted by a grating in the spectroscope at the wavelengths represented by the slits in the two sets will fall on an exit slit in an exit mask of the spectroscope and thence pass to a photodetector. This arrangement enables the shift between the different sets of wavelengths to be achieved without introducing mechanical jitter, since the photodetector output may be electronically gated so as to be measured only for predetermined periods when light is passing first through one and then through the other set of slits.

15 Claims, 3 Drawing Figures

DETECTOR
MOTOR
CALIBRATION CELLS

CALIBRATION CELLS
MOTOR
42
DETECTOR

DIGITAL DATA
TIMING CONTROL
MUX 8
12 BIT
A/D
MOTOR
MOTOR SPEED CONTROL
CLOCK
GATE CONTROL
PRODUCT DETECTOR GATING
INTEGRATOR
INTEGRATOR
BALANCE
AGC
DETECTOR

MONITORING GAS AND VAPOR CONCENTRATIONS

FIELD OF THE INVENTION

This invention relates to apparatus for monitoring the concentration of gases and vapours by gas absorption spectroscopy, emission spectroscopy or fluorescence spectroscopy.

BACKGROUND OF THE INVENTION AND PRIOR ART STATEMENT

The monitoring of concentrations of specific gases and vapours, particularly very low concentrations of such gases and vapours, is becoming increasingly important in many applications, particularly in pollution control and other environmental monitoring operations. A number of techniques have been employed or proposed for such applications. An ideal instrument for field use has sufficient sensitivity to respond to very low gas or vapour concentrations, a fast response time, and sufficient robustness to be utilized in the field. The object of the present invention is to provide an instrument which can meet these requirements.

Absorption spectrometers are well known and have previously been utilized for monitoring gas concentrations. One type of such spectrometer particularly suited to the monitoring of low concentrations of specific gases is the correlation type spectrometer in which the transmission of light, usually ultraviolet light, through a gas sample being monitored at a predetermined set of wavelengths corresponding to the absorption maxima of the gas being monitored is compared with that of light at a set of wavelengths displaced from the absorption maxima, any difference detected providing a sensitive indication of the presence of the gas being monitored and its concentration, since at low concentration the absorption by a gas is proportional to its concentration. In such intruments, light passed along an absorption path through gas being monitored is analyzed in a spectrometer and the desired wavelengths are isolated by means of a slotted mask or masks.

In one arrangement described in U.S. Pat. No. 3,518,002 issued June 30, 1970 to Barringer, the spectrum of the dispersed light passed through the sample is caused to fall on a slotted mask and is oscillated relative thereto by a vibrating refractor, so that the slots in the mask move cyclically into and out of correlation with the wavelengths corresponding to the absorption maxima of the gas being analyzed. In other proposed arrangements, the mask itself is vibrated.

In U.S. Pat. No. 3,837,744, issued to Egan et al, the light passed through the absorption cell is divided in two and caused by a radiation chopper to pass alternately along different paths through different slotted masks. In U.S. Pat. No. 4,057,734 issued Nov. 8, 1977 to Barringer, a radiation chopper is again used to pass the light from the absorption cell alternately along two different paths. Both these systems require duplication of many of the optical components of the system.

A correlation spectrometer is marketed by Lear Siegler Incorporated which differs from the foregoing in that the light is restricted to a set of required wavelengths prior to its passage through the absorption cell, and the rate of change of absorption by the cell as the wavelengths are swept is sensed so as to detect the gas being monitored. The prior restriction of the wavelengths present in the cell reduces spurious outputs.

All of the above systems rely on mechanical means to achieve the required correlation action by chopping or oscillating between the different sets of wavelengths at which absorption is being compared. I have found that at low gas concentrations, the sensitivity of the systems is limited by mechanical "noise" or jitter, and the reduction of such jitter presents particular problems in systems for field use, which may have to be used in environments on vehicles or aircraft which subject the equipment to vibration and other stresses. Existing systems have inevitably involved a compromise between robustness and mechanical precision.

SUMMARY OF THE INVENTION

These problems are overcome in the present invention by adopting an arrangement which avoids the necessity for precision mechanical components, eliminates the effect of mechanical jitter, and does not require duplicated optical components.

Accordingly, the invention provides in a method of monitoring gas or vapour concentrations in a sample by comparing the behaviour thereof in respect of light at at least one first wavelength corresponding to at least one behavioural maximum of the gas being monitored with that in respect of at least one second adjacent wavelength at which the gas shows a behavioural minimum, the improvement wherein the first and second wavelengths are selected by passing light through a spectrometer comprising slitted entrance and exit masks and an optically diffractive component, one of said masks having a plurality of slits determining different angles of diffraction of said first and second wavelengths, and selecting said first and second wavelengths alternately by permitting alternate passage of said light through slits in said mask with plural slits corresponding to angles of diffraction characteristic of said first and second wavelengths respectively.

This mode of operation does not require any duplication of the optical components of the system, nor any moving parts in the system save a simple shutter controlling the passage of light through the entrance mask. Preferably the light is passed through the sample between the exit slit and the photodetector. Preferably also light is masked from one or other of said sets of slits by movement of the shutter, and movement of the shutter is monitored and utilized to trigger an electronically clocked gating signal operating to gate the signals from said photodetector for precisely controlled durations fully within those periods when the sets of slits in the mask are fully masked or unmasked. This eliminates mechanical jitter and improves the sensitivity of the method.

The terms "behavioural maximum" and "behavioural minimum" are used in recognition of the fact that the method and apparatus of this invention find utility not only in conjunction with absorption spectroscopy, in relation to which they will be described in more detail, but in conjunction with other forms of spectroscopy in which a gas or vapour sample is utilized to influence the spectral composition of radiation passing along a defined path. If it is desired to compare the behaviour of the sample at different adjacent wavelengths or sets of wavelengths at which the gas or vapour being monitored exhibits marked behavioural differences which will be shown up by the comparison, then the techniques of the invention may be valuable. For example, in fluorescence spectroscopy, the behaviour monitored will be its fluorescence under the influence of incident radiation of different wavelengths, whilst in emission spectroscopy, it is the influence of the sample upon the radiation of the source itself at specific frequency which is measured, the source being a gas discharge lamp utilizing the sample itself as a gaseous medium.

The invention also extends to apparatus for monitoring the concentrations of a particular gas or vapour in a gas sample, comprising a source of radiation, an optical sensor and a spectroscope all forming part of an optical path between said source and said sensor, said spectroscope comprising an optically diffractive component and entrance and exit masks, at least one of which has multiple slits, the diffractive component and the slits in said mask being disposed relative to one another so that only light of selected wavelengths can traverse said optical path, each of the multiple slits passing a different wavelength, means adjacent said multiple slitted mask and operable so as selectively to block and unblock said slits whereby to permit the passage at different times of first and second sets of wavelengths associated with first and second sets of slits in said multiple slitted mask, means to introduce said sample into said optical path in a manner such that it can influence the spectral composition of the light passing along said path, and means to compare the outputs of said sensor when receiving light of said first and second sets of wavelengths respectively.

Preferably the means to compare the sensor output includes comparator means and gating means phase locked to the blocking means and operative to prevent passage of the sensor output to the comparator means when any of the slits in the mask are partially blocked, whilst passing the sensor output for precisely predetermined periods.

Preferably also the means to compare said sensor output includes comparator means, and gating means phase locked to said blocking means and operative to prevent passage of said sensor output to said comparator means when any of said slits in said multiple slitted mask are partially blocked, whilst passing said output for precisely predetermined periods. The blocking means or shutter is preferably adjacent the entrance mask, and the sample is preferably introduced between the exit mask and the sensor. Light guides or other optical relay systems may be used to make connection of the optical path to the sample introduction means, so as to provide a modular structure and flexibility in sampling techniques.

SHORT DESCRIPTION OF THE DRAWINGS

In the drawings:

FIG. 1 is a schematic diagram of the optical components of an embodiment of apparatus in accordance with the invention, FIG. 2 is a schematic diagram of the electronic components of the apparatus, and FIG. 3 is a diagrammatic view of a shutter at an entrance mask of a spectrometer forming part of the apparatus.

DESCRIPTION OF THE PREFERRED EMBODIMENT

Figure 1:
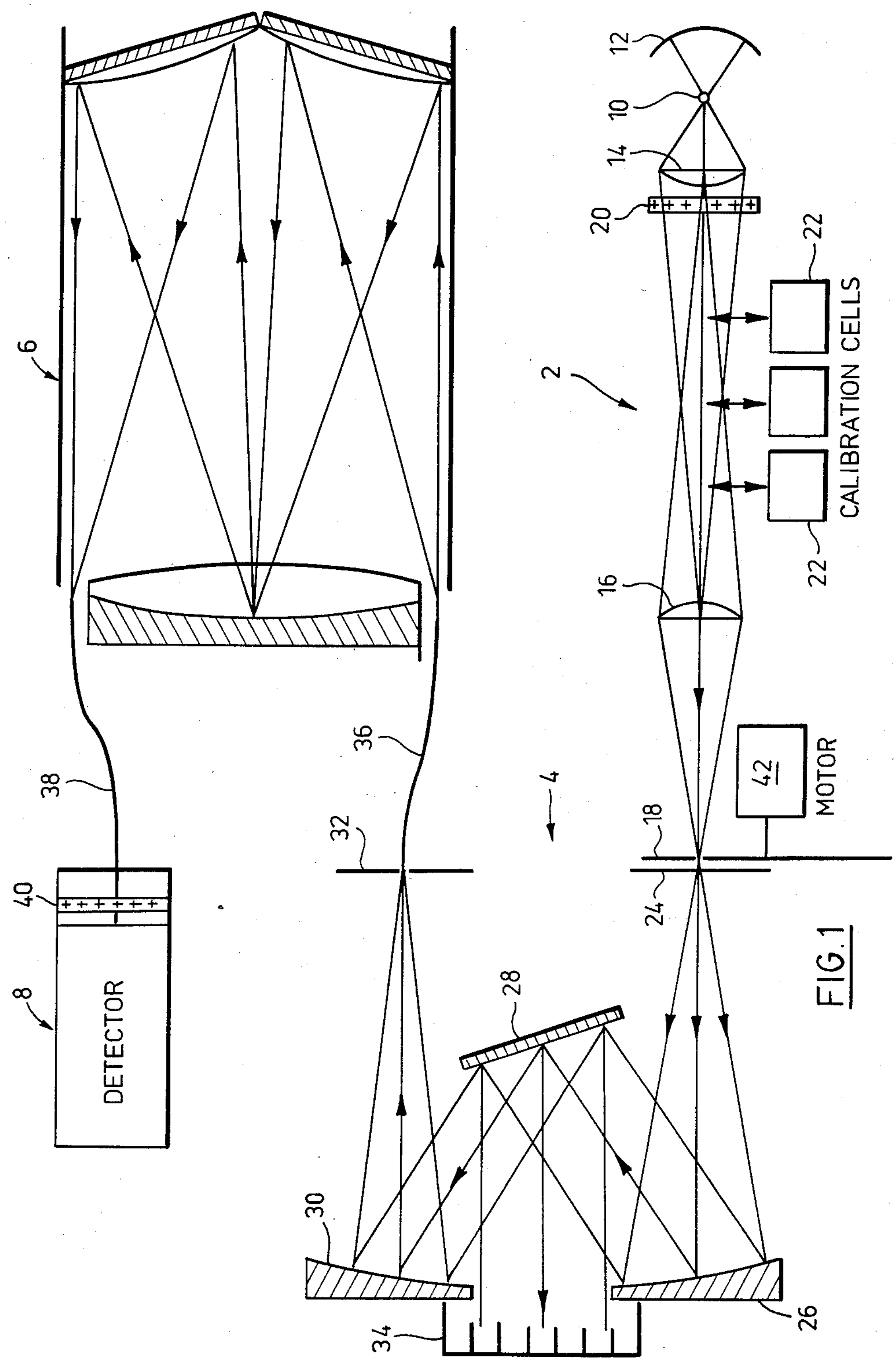

Referring to FIG. 1, the apparatus shown comprises four major components, a light source 2, a spectral filter or spectrometer 4, an absorption cell 6 and a photodetector 8.

The light source 2 essentially comprises means of producing a collimated source of light including desired wavelengths in a region of the visible or invisible spectrum, typically the ultraviolet region of the spectrum. It will be assumed for the purpose of description that an ultraviolet spectrometer is being described, but it will be appreciated that the principles of the invention are equally applicable to spectrometers operating in other portions of the optical spectrum provided that optical components of appropriate characteristics are utilized. In the described embodiment, the source comprises a lamp 10 which may be provided if appropriate with a rear reflector 12 to increase its efficiency, and a collimator comprised by optical elements 14 and 16 so as to focus a patch of light from the lamp onto a shutter 18 forming part of the filter 4. An optical filter 20 may be used to provide a barrier to heat radiation from the lamp 10 and restrict the spectrum of the lamp output to the particular region required. The lamp will be chosen to provide a continuous or discontinuous spectrum appropriate to the intended use of the instrument. For monitoring atmospheric sulphur dioxide, a deuterium lamp is suitable.

The source 2 may further include a plurality of solenoid actuated calibration cells 22, the solenoids of which may be selectively actuated to place one or other of the cells in the path of light passing between the lenses 16, 20. The output from the source 2 is thus a collimated beam of light, having a restricted optical spectrum and selectively modified by passage through (or blockage by) one or other of the calibration cells. In an alternative arrangement, the cells are placed on a rotating turret or disc for selective interposition in the light beam.

Figures 2, 3:
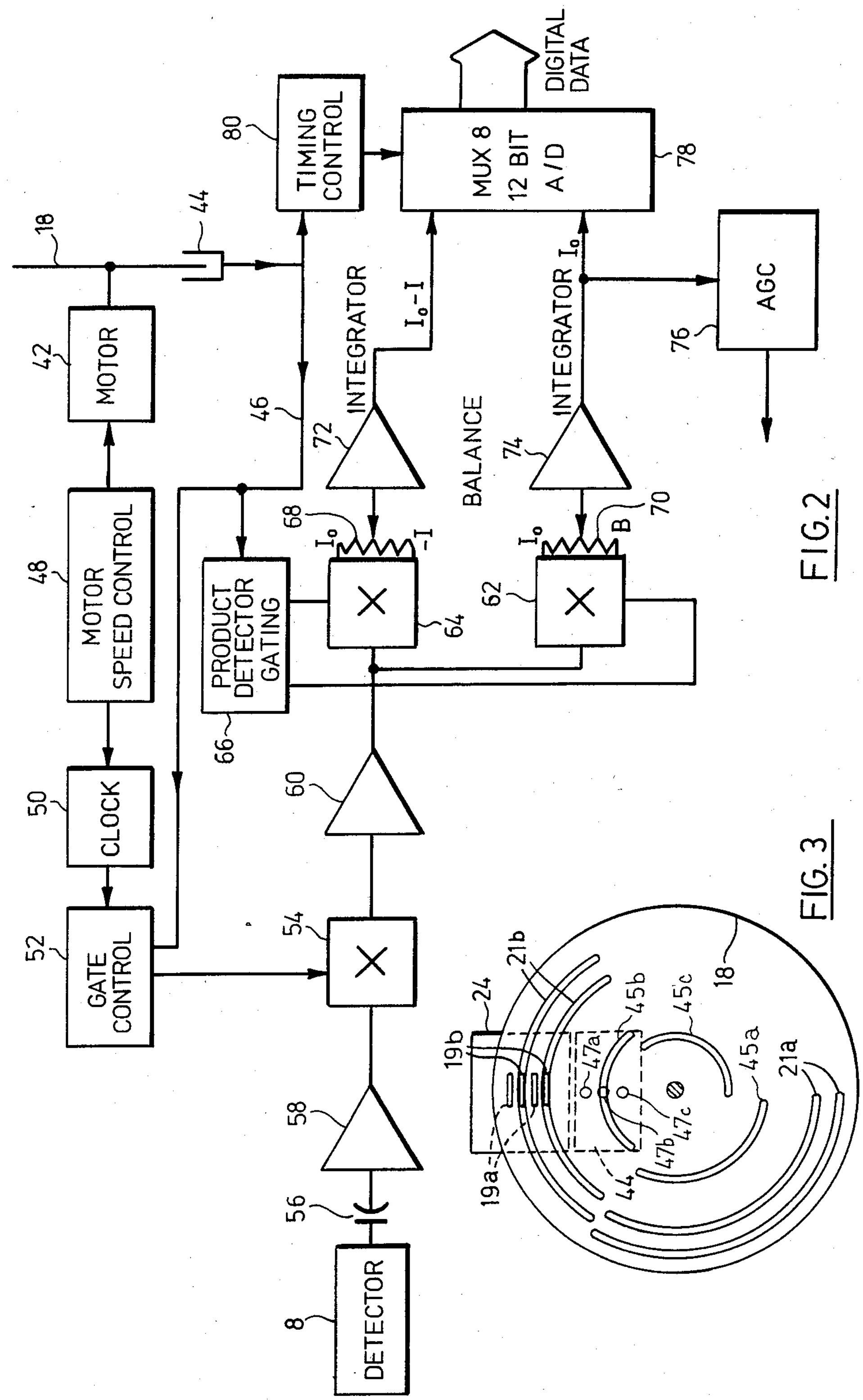

The filter 4 acts to process further the output of the light source to restrict it in turn to one of two alternative groups of wavelengths. The first of these groups of wavelengths corresponds to the peaks of spectral absorption of a gas to be monitored, for example sulfur dioxide, whilst the second group is displaced from the first group so as to lie in regions of minimum absorption. The groups of wavelengths are selected by use of a shutter, an exemplary embodiment of which is shown in FIG. 3. A rotating shutter 18 acts in conjunction with a fixed mask 24 having two groups of narrow parallel slits 19*a*, 19*b* precisely formed therein and representing the different wavelengths in the two groups. The shutter 18 has groups of somewhat wider segmental slots 21*a* and 21*b* formed therein, and is rotatable so that the slots therein successively permit light from the source 2 to fall on the slits 19*a* of the first group and the slits 19*b* of the second group. Light passing through the slits is focussed into a parallel beam by a concave mirror 26, the beam being incident on a diffraction grating 28 (or other equivalent optical device capable of resolving the spectral components of the incident light). Light diffracted from the grating at a selected angle is focussed by a concave mirror 30 onto a slit in an exit mask 32. The angles of incidence of the light from the mirror 26 on the grating are determined by the position of the slits in the entry mask 24. These angles are such and the grating 28 is so disposed and has such a groove spacing that first order light is diffracted by the grating at the same angle for each slit in the group at the wavelength represented by that slit. The light so diffracted is focussed by the mirror 30 on the slit in the exit mask 32, which thus only passes light at the wavelengths of the group selected by the shutter 18. A light trap 34 may be provided to absorb zero order reflections from the grating 34 so as to reduce unwanted output due to stray light.

A suitable optical relay system or a fibre optic light guide 36 extends from the slit in the exit mask 32 to the entrance of the absorption chamber 6 which contains a gas sample to be monitored. Normally such a chamber will be of the multipass type as shown so as to lengthen the path of light through the gas, and the arrangements for introducing the sample into the chamber will be appropriate to the application in which the apparatus is to be used. The construction and arrangement of such chambers is well understood in the art and forms no part of the present invention. Alternatively, when atmospheric pollutants are being monitored, the cell may not be enclosed at all, simply comprising suitable lens systems to launch light towards and receive light from a remote retromirror.

A further optical relay system or fibre optic light guide 38 extends from an exit from the absorption chamber to the detector 8. The use of such optical relay systems or light guides 36 and 38 enables the absorption chamber to be formed as a separate module which may be located remotely from the remainder of the apparatus, and also enables use of the type of chamber best suited to a particular application to be utilized.

The detector 6 comprises a photo-electric device having an appropriate spectral range, and is equipped with a further filter 40 to exclude light outside the wanted portion of the optical spectrum.

Referring now to FIGS. 2 and 3, the shutter 18 is driven by a motor 42 so as to rotate the shutter through positions in which it permits illumination of one or other or neither of the sets of slits 19*a*, 19*b* in the entrance mask 24. The position of the shutter is sensed by a photo-electric optical pick-off system 44 coacting with apertures 45*a*, 45*b* and 45*c* in the shutter 18, the apertures being selectively alignable with photosensors 47*a*, 47*b* and 47*c* in the system 44. The pick-off system senses the presence of the shutter in its positions where it illuminates the slits 19*a* and 19*b* and in a position where it does not permit light to pass through either set of slits and transmits timing signals to other portions of the control circuit on lines 46. The motor 42 is operated at a desired rate by means of a speed control 48, which receives a signal from a clock generator 50. The clock generator 50 comprises a precision frequency-stable crystal controlled clock, the clock pulses having a repetition rate very much greater than the rotation rate of the shutter 18. The frequency of the clock is divided by the motor speed control to determine the shutter rotation rate. The gate control circuit 52 receives signals from the pick-off system 44 and the clock generator 50.

On receiving a signal from the pick-off system indicating that the shutter has entered one of its abovementioned positions, the circuit 52 counts clock pulses to establish a delay related to the shutter cycling rate and then counts further pulses to generate a gating signal of a precise duration again related to the shutter rotation rate. The delay is made long enough and the gating signal is terminated soon enough to ensure that the gating signal falls wholly within the period in which the shutter remains in one of its positions, due allowance being made for any mechanical jitter in operation of the gate. The gating signal is used as the control signal for a transmission gate 54.

The detector 8 is coupled by a blocking capacitor 56 to a preamplifier 58. The capacitative coupling serves to block any D.C. component or drift of the output of detector 8, which may be any suitable photosensitive device; to achieve optimum sensitivity in the ultraviolet and visible regions a photomultiplier will normally be utilized. The gate 54 opens to pass the preamplifier output during precisely predetermined periods wholly within the time that the shutter 18 allows light to fall on one or other of the sets of slits in the entrance mask 24, being closed whenever any of the slits are only partially illuminated. The output of the gate is further amplified in an amplifier 60 and applied to two transmission gates 62 and 64 operated as product detectors by gating signals from a gating signal generator 66 driven by signal from the line 46. A first of these gating signals is such that the gates both pass the signal to outputs $I_o$ in response to the shutter 18 entering a position in which its slots 21 allow light to fall on the group of slits 19*b* in the entrance mask 24 corresponding to the second group of wavelengths lying in regions of minimum absorption by the gas being monitored. A second of these signals is such as to cause gate 64 to pass the complement of the signal to an output I in response to the shutter 18 entering a position in which its slots 21 allow light to fall on the group of slits 19*a* corresponding to the first group of wavelengths lying in regions of maximum absorption by the gas being monitored. A third signal causes the gate 62 to pass the signal to an output B when the shutter is in its position such that neither group of slits in the mask 24 is illuminated. The outputs of each gate are linked by potentiometers 68, 70, taps on which are adjusted to give zero outputs from integrators 72, 74 when the signals passed when the shutter is in each position are equal, e.g., when no light is passed by the shutter 18. The integrators 72, 74 thus provide output signals proportional respectively to the mean values of output $I_o$—output I and output $I_o$—output B. The first of these output signals is thus proportional to the difference in transmission through the sample cell 6 for light of wavelengths in the first and second groups, whilst the second output signal is proportional to the degree of transmission of wavelengths of the second group which are selected so that absorption by a gas being monitored will be at a minimum. The second output signal is applied to an automatic gain control circuit 76, the output of which is applied to control the gain of the preamplifier 58 so as to keep this second signal constant. The magnitude of the first signal is then proportional to the degree of absorption by the gas being monitored, which at low concentrations is proportional to the concentration of the gas. Conveniently, the two output signals are converted to digital form and multiplexed by an analogue/digital converter and multiplexer clocked by signals from the line 46 so as to provide a digital output which may be stored and/or applied to a digital computer (not shown) for further processing. The computer may be programmed to insert the cells 22 to achieve span and calibration sequences, to record and remove zero drift, and to supervise the various control blocks shown in FIG. 2.

The arrangement described is susceptible to considerable variation. Whilst two sets of slits in the mask 24 are described, it would be possible to provide only one set of slits, and instead to provide two exit slits in the exit mask, and operate the shutter 18 adjacent the exit mask so as to select either the wavelengths of maximum absorption by gas being monitored, or wavelengths having a predetermined displacement therefrom. The described arrangement is preferred however, since it provides greater flexibility in selecting the second set of wavelengths so as to avoid wavelengths absorbed by gases other than that being monitored. It is also possible with the described arrangement to provide more than two sets of slits in the entrance mask, the shutter then being moved into an additional position or positions in each cycle to permit the passage of light through sets of slits positioned so as to cause wavelengths characteristic of the absorption maxima of an additional gas or gases to fall on the slit in the exit mask, or wavelengths displaced to both sides of the absorption maxima to provide a double comparison.

It is preferred that, in the optical path through the apparatus, the sample cell or equivalent means follows the isolation of the desired wavelengths in the spectroscopic components so that only those wavelengths are applied to the gas. Many of the advantages of the invention can however be achieved in arrangements where the sample cell precedes the spectroscopic components. Likewise, it is preferred that the calibration cells 22 be inserted between the lenses 14 and 16 so as to minimize effects due to reflection, but other positions in the optical path are possible.

I claim:

1. In a method of monitoring low gas or vapour concentrations in a sample by correlating the behaviour thereof in respect of light at at least one first wavelength corresponding to at least one behavioural maximum of the gas being monitored with that in respect of at least one second adjacent wavelength at which the gas shows a behavioural minimum, the improvement wherein the first and second wavelengths are selected by passing light from a common entry beam through a spectrometer comprising slitted entrance and exit masks and an optically diffractive component, one of said masks having a plurality of slits determining different angles of diffraction of said first and second wavelengths, and selecting said first and second wavelengths alternately by permitting alternate passage of said light through slits in said mask with plural slits corresponding to angles of diffraction characteristic of said first and second wavelengths respectively, wherein light is selectively masked from slits in said mask with plural slits by movement of a slotted shutter, and movement of said slotted shutter is monitored and utilized to trigger a precision electronic gating signal operating to gate signals from a photodetector receiving light from the spectrometer for precisely controlled durations fully within periods when said selected slits are fully masked or unmasked, and wherein said light is passed through said sample between said exit slit and said photodetector.

2. A method according to claim 1, wherein the entrance mask has the plural slits, and the slits are in sets corresponding to a plurality of behavioural maxima and a plurality of behavioural minima respectively.

3. A method according to claim 1 or 2, wherein the responses compared are absorption maxima and minima of the gas being monitored.

4. Apparatus for monitoring a low concentration of a gas or vapour in a gas sample comprising:

- a source of light containing certain predetermined wavelengths in a desired spectral region,
- a collimator receiving said light and concentrating it upon a slitted area in an entrance mask,
- a slitted shutter movable adjacent said entrance mask into a first position such that slits in the shutter permit light to pass through a first set of parallel slits in the entrance mask and a second position such that first slits in the shutter permit light to pass through second slightly displaced set of parallel slits in the entrance mask,
- means to move the shutter cyclically into said positions,
- a dispersion grating disposed to receive and diffract light from said parallel slits in said entrance mask,
- an exit mask defining at least one exit slit disposed to receive light diffracted by said grating at specific wavelengths determined by the relative dispositions of said entrance mask slits, said grating and said exit slit, said wavelengths comprising a first set of wavelengths characteristic of the absorption maxima of the gas being monitored and determined by said first set of slits and a second set of wavelengths determined by said second set of slits which set is displaced from said first set of wavelengths and characterized by minimum absorption by the gas being monitored,
- means establishing an optical path through a gas sample being monitored,
- an optical relay system extending from said exit slit to the beginning of said optical path,
- a photo-electric sensor device,
- an optical relay system extending from the end of said optical path to said sensor device,
- means to generate signals in response to the entry of said shutter into said positions,
- a frequency stable electronic clock pulse generator generating pulses at a frequency which is very high compared to the cycling rate of the means moving said modulator,
- gate control means receiving said clock pulse signals from said clock pulse generator and operative to count said pulses and generate gating signals commencing a predetermined time after receipt of a response signal from said signal generating means and lasting a period corresponding to a predetermined count of said gate pulses related to the rotation rate of the shutter such that the gating signals commence after the shutter has entered its said positions and end before it leaves them,
- a transmission gate controlled by said gating signal and passing the signals from said sensor device in response thereto,
- comparator means receiving the signals from said gate and comparing the magnitude of the signals passed when the shutter is in said first and second positions, and
- wherein said shutter has a third position such that light can pass neither set of slits in the entrance mask, and further comparator means receives signals from said gate when the shutter is in said third position for comparison with the signals passed in one of said first and second positions.

5. Apparatus according to claim 4, wherein the light source provides light in the ultraviolet region.

6. Apparatus according to claim 5, wherein the first set of wavelengths correspond to absorption maxima of sulfur dioxide.

7. Apparatus according to claim 4, wherein means to introduce calibration cells into the light path are associated with the collimator.

8. Apparatus according to claim 4, wherein an automatic gain control circuit receives the output from the further comparator means and applies it as a gain control signal to a variable gain amplifier between said sensor and said comparators.

9. Apparatus for monitoring low concentrations of a particular gas or vapour in a gas sample, comprising a source of a beam of radiation, a spectrometer receiving said beam and an optical sensor, all forming part of an optical path between said source and said sensor, said spectrometer comprising an optically diffractive component and slitted entrance and exit masks, at least one of which has multiple slits, the diffractive component and the slits in said mask being disposed relative to one another so that only light of selected wavelengths, corresponding respectively to at least one absorption maximum and at least one adjacent absorption minimum of said particular gas or vapour, can traverse said optical path, each of the multiple slits passing a different one of said wavelengths, means adjacent said multiple slitted mask and operable so as selectively to block and unblock said slits whereby to permit the passage at different times of first wavelengths corresponding to said at least one absorption maximum, and second wavelengths associated with said at least one absorption minimum, means to introduce said sample into said optical path between said spectrometer and said sensor in a manner such that it can influence the spectral composition of the light passing along said path, and means to correlate the outputs of said sensor when receiving light of said first and second wavelengths respectively, said means including comparator means, and gating means phase locked to said blocking means and operative to prevent passage of said sensor output to said comparator means when any of said slits in said multiple slitted mask are partially blocked, whilst passing said output for precisely predetermined periods when those of said slits passing wavelengths corresponding to said absorption maxima are unblocked and for precisely defined periods when those of said slits passing wavelengths corresponding to said absorption minima are unblocked.

10. Apparatus according to claim 9, wherein the blocking means comprises a shutter rotatable in a plane adjacent said multiple slitted mask and having radially and circumferentially spaced sets of arcuate slits therein, the sets of arcuate slits being selectively alignable with different sets of slits in the mask on rotation of the shutter, and wherein the gating means comprises means to generate a signal responsive to entry of a set of slits in the shutter into alignment with a set of slits in the mask, a clock pulse generator, means responsive to said signal to count pulses from said clock pulse generator and to generate an enabling signal continuity between predetermined counts, and a transmission gate receiving said enabling signal and operative in response thereto to connect said sensor output to said comparator means.

11. Apparatus according to claim 10, wherein the signal generating means comprises additional radially and circumferentially spaced slits in the shutter, and photosensors in radial alignment with said additional slits.

12. Apparatus according to claim 10, wherein the blocking means is adjacent the entrance mask.

13. Apparatus according to claim 10, wherein the sample introduction means is optically connected to the exit mask and the light sensor by optical relay systems.

14. Apparatus according to claim 9, wherein the gating means are further operative to pass said output for further precisely defined periods when all of said slits in said multiple slitted mask are blocked, and further comparator means are provided to compare said output during said further periods with said output during said periods when those of said slits passing wavelengths corresponding to said absorption minima are unblocked, whereby to provide at the output of said further comparator a reference for the correlation output from the first comparator.

15. Apparatus according to claim 14, wherein an automatic gain control circuit receives the output from the further comparator means and applies it as a gain control signal to a variable gain amplifier between said sensor and said comparators.

* * * * *